(12) United States Patent
Choi

(10) Patent No.: US 6,924,852 B2
(45) Date of Patent: Aug. 2, 2005

(54) THIN FILM TRANSISTOR ARRAY SUBSTRATE FOR PREVENTING STATIC ELECTRICITY AND MANUFACTURING METHOD THEREOF

(75) Inventor: Woo Hyuk Choi, Daegu (KR)

(73) Assignee: LG. Philips LCD Co., Ltd., Seoul (KR)

(*) Notice: Subject to any disclaimer, the term of this patent is extended or adjusted under 35 U.S.C. 154(b) by 79 days.

(21) Appl. No.: 10/281,299

(22) Filed: Oct. 28, 2002

(65) Prior Publication Data
US 2003/0197814 A1 Oct. 23, 2003

(30) Foreign Application Priority Data
Apr. 17, 2002 (KR) ........................................ 2002-21055

(51) Int. Cl.$^7$ ........................... G02F 1/1333; G02F 1/13
(52) U.S. Cl. ........................................ 349/40; 349/192
(58) Field of Search ................................... 349/40, 192

(56) References Cited

U.S. PATENT DOCUMENTS

| | | | | |
|---|---|---|---|---|
| 5,668,032 A | * | 9/1997 | Holmberg et al. | 438/149 |
| 6,005,647 A | * | 12/1999 | Lim | 349/40 |
| 6,128,051 A | * | 10/2000 | Kim et al. | 349/40 |
| 6,184,948 B1 | * | 2/2001 | Lee | 349/54 |
| 6,392,719 B2 | * | 5/2002 | Kim | 349/40 |
| 6,566,902 B2 | * | 5/2003 | Kwon et al. | 324/770 |
| 6,642,972 B2 | * | 11/2003 | Yoo et al. | 349/40 |
| 6,654,074 B1 | * | 11/2003 | Ha et al. | 349/40 |

FOREIGN PATENT DOCUMENTS

| | | |
|---|---|---|
| JP | 10-339886 | 12/1998 |
| KR | 1998-022522 | 7/1998 |

* cited by examiner

Primary Examiner—Tarifur R. Chowdhury
(74) Attorney, Agent, or Firm—Morgan Lewis & Bockius LLP

(57) ABSTRACT

A thin film transistor array substrate for a liquid crystal display includes a plurality of thin film transistors, a plurality of data lines each connected to respective ones of the thin film transistors, the data lines including odd data lines and even data lines, an odd shorting bar commonly connected to the odd data lines of the data lines, an even shorting bar commonly connected to the even data lines of the data lines, and an equal potential shorting bar commonly connecting the odd data lines with the even data lines to form an equal potential.

23 Claims, 12 Drawing Sheets

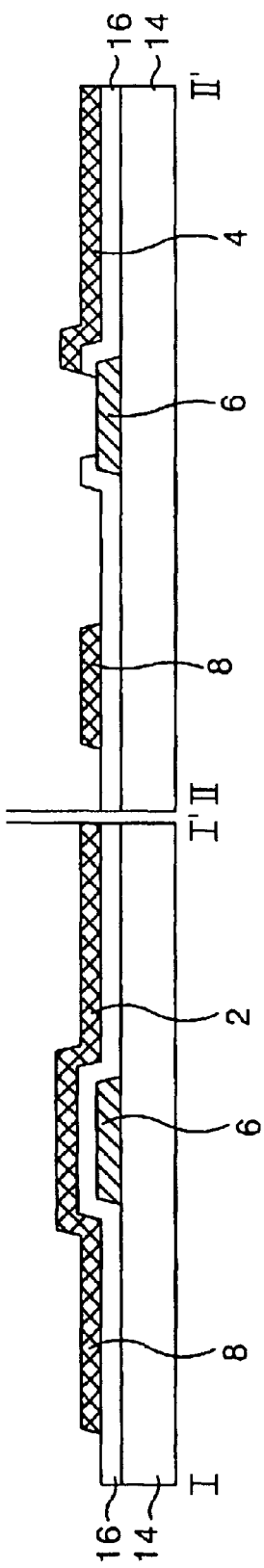
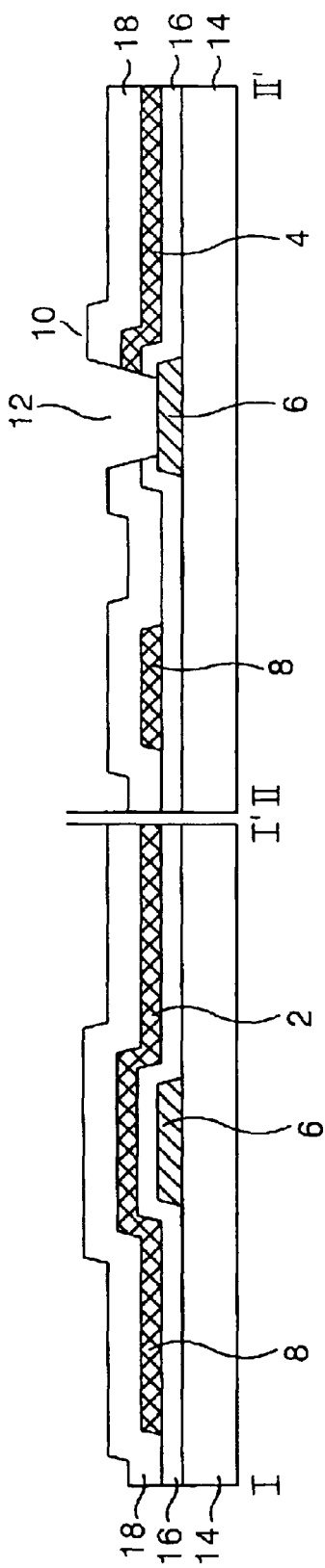

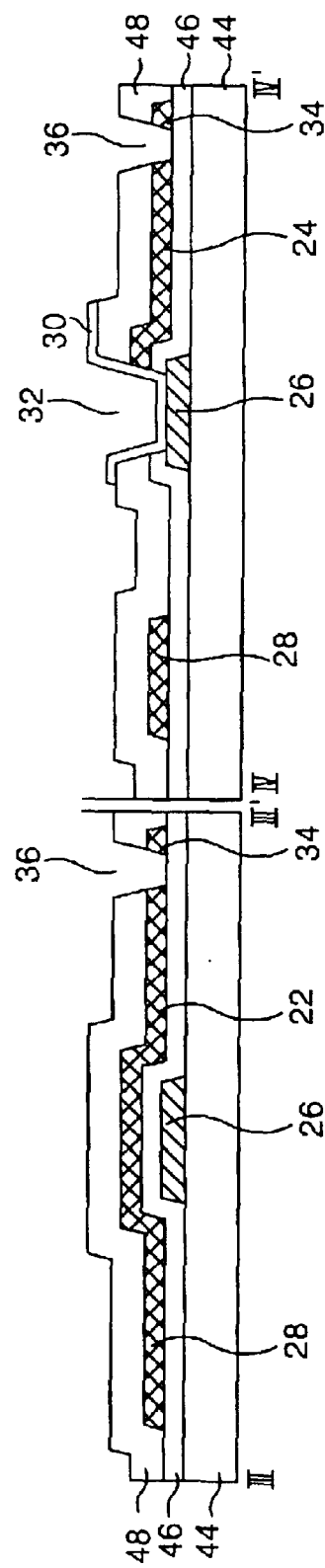

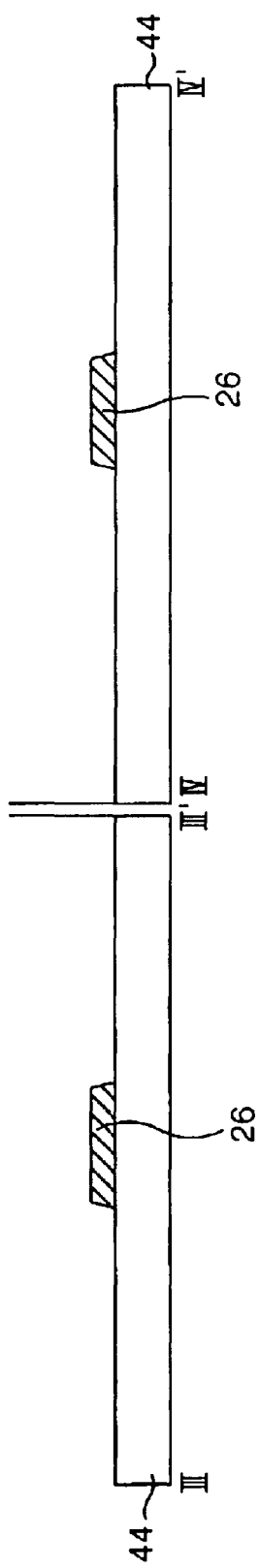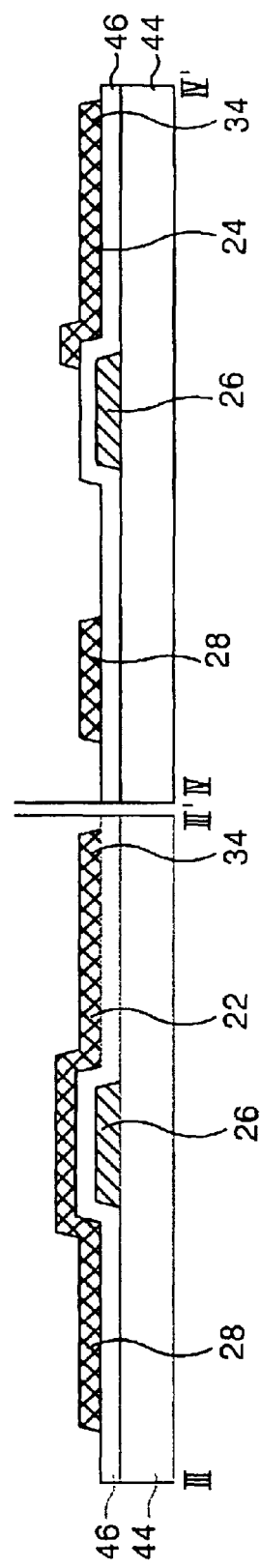

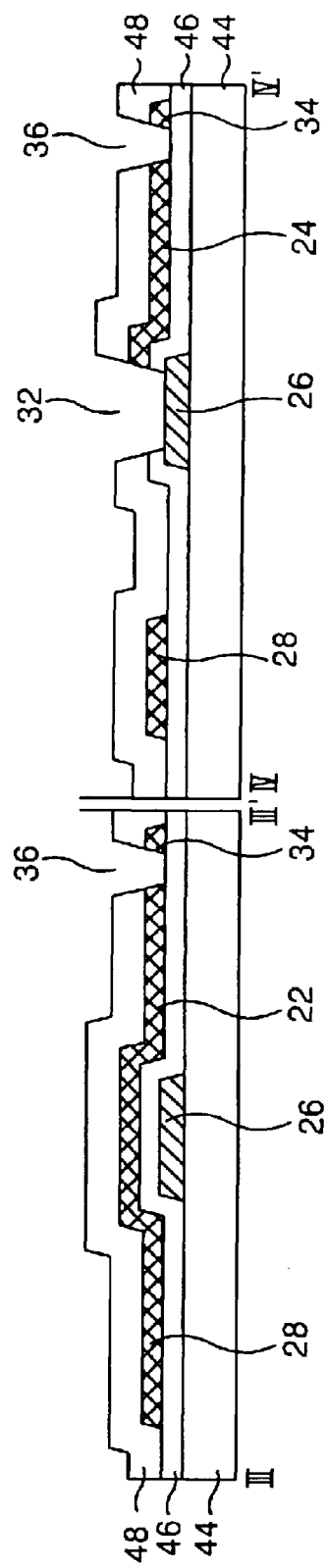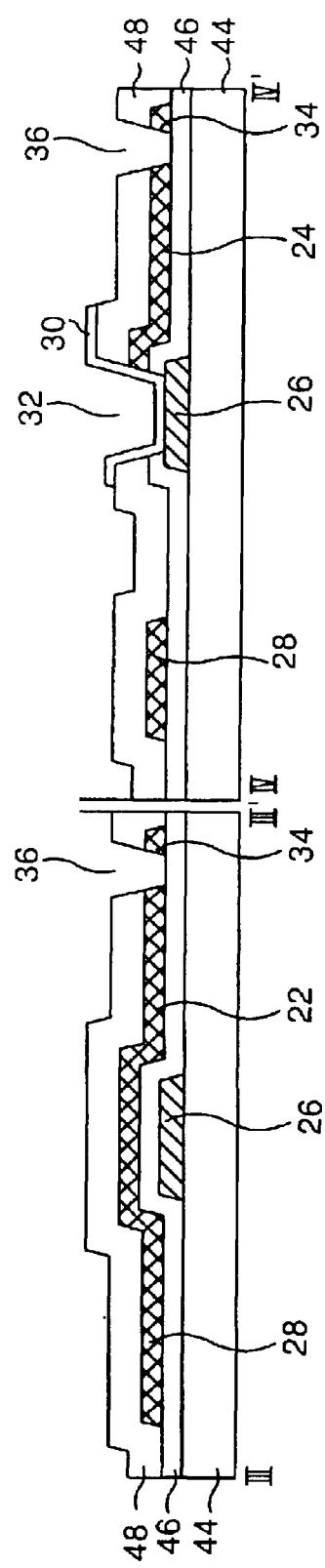

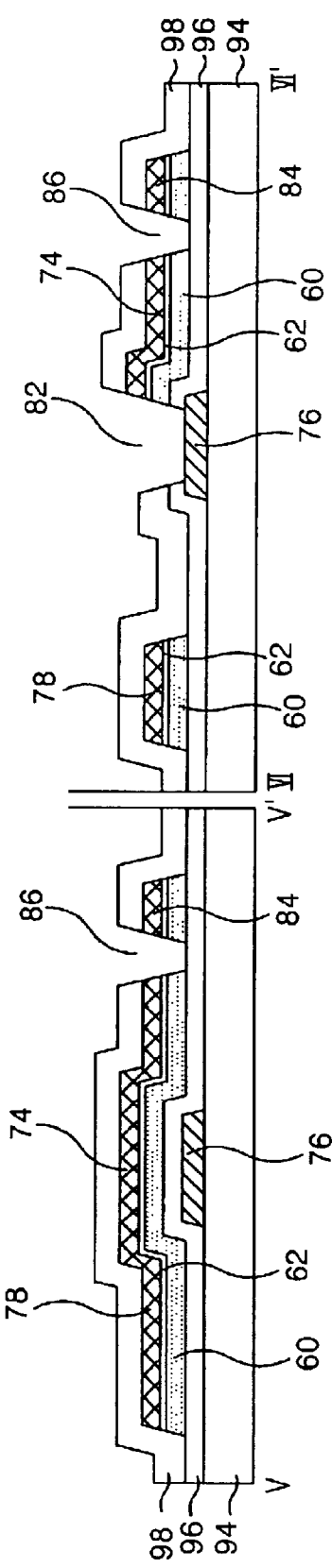
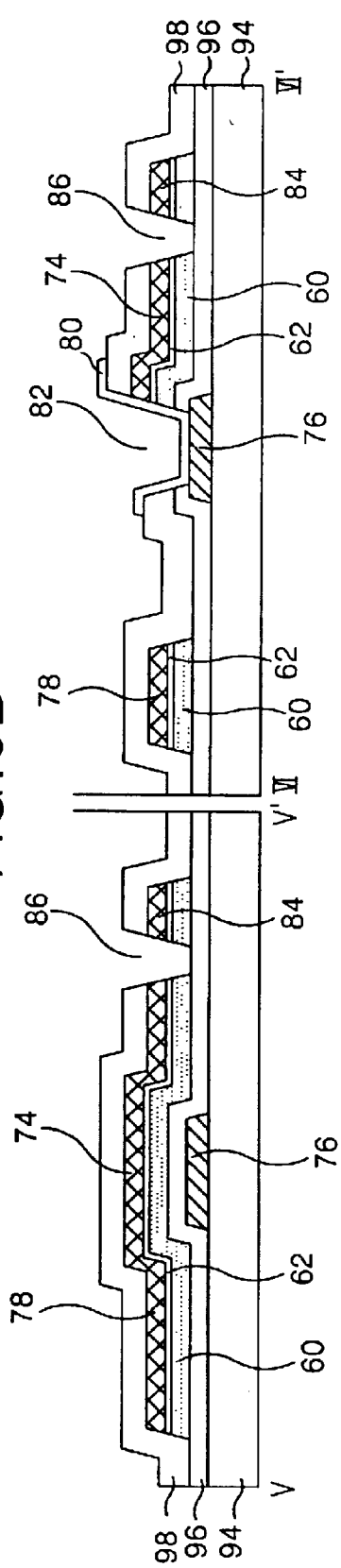

THIN FILM TRANSISTOR ARRAY SUBSTRATE FOR PREVENTING STATIC ELECTRICITY AND MANUFACTURING METHOD THEREOF

The present application claims the benefit of Korean Patent Application No. P2002-21055 filed in Korea on Apr. 17, 2002, which is hereby incorporated by reference.

BACKGROUND OF THE INVENTION

1. Field of the Invention

The present invention relates to a thin film transistor array substrate and a manufacturing method thereof, and more particularly, to a thin film transistor array substrate and a manufacturing method thereof with reduced static electricity.

2. Description of the Related Art

Generally, a liquid crystal display (LCD) controls a light transmittance using an electric field to display a picture. To this end, the LCD includes a liquid crystal panel having liquid crystal cells arranged in a matrix, and a driving circuit for driving the cells of the liquid crystal panel. Specifically, the liquid crystal display panel includes a thin film transistor array substrate and a color filter array substrate opposed to each other. A spacer is positioned between the thin film transistor array substrate and the color filter array substrate to keep a constant cell gap, and a liquid crystal is filled in the cell gap.

The thin film transistor array substrate includes gate lines, data lines, thin film transistors, pixel electrodes, and alignment films. Each thin film transistor serves as a switching device for a respective intersection between a gate line and a data line. A pixel electrode with a corresponding alignment film coated thereon is formed for each liquid crystal cell and connected to the thin film transistor. The gate lines and the data lines receive signals from the driving circuits via each pad portion. The thin film transistor applies a pixel voltage signal fed to the data line in response to a scanning signal fed to the gate electrode of the thin film transistor. The color filter array substrate includes color filters formed for each liquid crystal cell, a black matrix for dividing the respective color filters and for reflecting an external light, a common electrode for commonly applying a reference voltage to the liquid crystal cells, and an alignment film coated on the common electrode. The liquid crystal display panel is completed by preparing the thin film array substrate and the color filter array substrate individually, joining them together, injecting a liquid crystal between the two substrates and sealing the resultant panel.

The thin film transistor array substrate passes a signal inspection process for detecting line defects, such as a short or a breakage of signal lines, and thin film transistor defects after the manufacturing process. For the signal inspection process, the thin film transistor array substrate is provided with an odd shorting bar and an even shorting bar connected with the lines being divided into odd lines and even lines for each of the gate lines and data lines. Specifically, an inspection of the gate lines is made using a gate odd shorting bar commonly connected to the odd gate lines and a gate even shorting bar commonly connected to the even gate lines. Similarly, an inspection of the data lines is made by a data odd shorting bar commonly connected to the odd data lines and a data even shorting bar commonly connected to the even data lines.

For instance, as shown in FIG. 1, the thin film transistor array substrate having a data shorting bar includes a thin film transistor 5 provided at each intersection of gate lines 1 and data lines 3. A pixel electrode connected to the thin film transistor 5, and a storage capacitor 17 is formed at an overlapping portion between the pixel electrode 15 and the pre-stage gate line 1. An array area has a gate pad portion (not shown) connected to the gate line 1 and a data pad portion 31 connected to the data line 3. An odd shorting bar 8 is commonly connected, via the data pad portion, to the odd data lines 2, and an even shorting bar 6 is commonly connected to the even data lines 4.

The gate line 1 intersects the data line 3 with a gate insulating film therebetween to provide electrical insulation. The thin film transistor 5 provided at each intersection of the gate lines 1 and the data lines 3 includes a gate electrode 7 connected to the gate line 1, a source electrode connected to the data line 3, a drain electrode 11 connected to the pixel electrode, and an active layer (not shown) overlapping with the gate electrode 7 and forming a channel between the source electrode 9 and the drain electrode 11. The active layer usually extends along the data line 3. On the active layer, an ohmic contact layer is provided at an area excluding a channel portion. Such a thin film transistor 5 allows a pixel voltage signal from the data line 3 to be applied into the pixel electrode 15 and then sustained in response to a scanning signal applied to the gate line 1.

The pixel electrode 15 is connected, via a first contact hole through a protective film (not shown) to the drain electrode 11 of the thin film transistor 5. The pixel electrode 15 generates a potential difference with respect to the common electrode provided at the upper substrate (not shown) by the charged pixel voltage. This potential difference rotates a liquid crystal positioned between the thin film transistor substrate and the upper substrate due to a dielectric anisotropy and transmits a light inputted, via the pixel electrode 15, from a light source (not shown) that radiates toward the upper substrate.

The storage capacitor 17 has a pre-stage gate line 1, a storage electrode 19 overlapping the gate line 1 with the gate insulating film therebetween, and a pixel electrode 15 overlapping the storage electrode 19 with the protective film therebetween and connected via a second contact hole 21 through the protective film. The storage capacitor 17 allows a pixel voltage charged in the pixel electrode 15 to be stably maintained until the next pixel voltage is applied.

The data line 3 is connected, via a data link 23 and a data pad portion 31, to the data driver while the gate line 1 is connected, via a gate link and a gate pad portion, to the gate driver. The data pad portion 31 includes a data pad 25 extended, via the data link 23 from the data line 3, and a data pad protection electrode 27 connected, via a third contact hole 29 passing through the protective film, to the data pad 25.

In the data shorting bar arrangement, an odd shorting bar 8 is commonly connected, via the data pad portion 31, to odd data lines 2 while an even shorting bar 6 is commonly connected, via the data pad portion, to even data lines 4. The odd shorting bar 8 is formed from a source/drain metal layer along with the data lines 3. The even shorting bar 6 is formed from a gate metal layer to provide insulation-against the odd data lines 2 crossing it. As shown in FIG. 2, the even shorting bar 6 formed from the gate metal layer is connected, via a contact electrode 10 formed over a fourth contact hole 12, to the even data lines 4 formed from a source/drain metal layer. When the thin film transistor array substrate is completed, a defect inspection of the data line 1 is made with the aid of the odd shorting bar 8 and the even shorting bar 6. Then, the data shorting bars 6 and 8 are cut along a scribing line between the even shorting bar 6 and the data pad portion 31.

FIG. 2 is a sectional view of the data shorting bar area taken along line I–I' and line II–II' in FIG. 1. The even shorting bar 6 formed from a gate metal layer is provided on the lower substrate 14, and the gate insulating film 16 is provided thereon. The odd data lines 2, the even data lines 4 and the odd shorting bar 8 formed from a source/drain metal layer are provided on the gate insulating film 16, and the protective film 18 is provided thereon. The contact hole 12 through the gate insulating film 14 and the protective film 18 is formed to expose the even data lines 4 and the even shorting bar 6. The contact electrode 10 is formed over the contact hole 12 to connect the even data lines 4 and the even shorting bar 6 made from a different metal layer to each other.

Hereinafter, a method of manufacturing the data shorting bar area will be described in detail with reference to FIGS. 3A to 3D and in conjunction with a method of manufacturing the thin film transistor array substrate.

Referring to FIG. 3A, the even shorting bar 6 is provided on the lower substrate 14. The even shorting bar 6 is formed by depositing a gate metal material onto the lower substrate by a deposition technique such as sputtering or the like, and then patterning it by photolithography and etching using a first mask. Such an even shorting bar 6 is formed along with gate patterns, each of which includes the gate line 1 and the gate electrode 7, etc. within the array shown in FIG. 1. The gate metal has a single-layer or double-layer structure of chrome (Cr), molybdenum (Mo), an aluminum group metal, or other suitable material.

Referring to FIG. 3B, the gate insulating film 16, the data lines 2 and 4 and the odd shorting bar 8 are disposed on the lower substrate 14 provided with the even shorting bar 6. The gate insulating film 16 is formed by entirely depositing a gate insulating material using a deposition technique such as plasma enhanced chemical vapor deposition or other technique. The gate insulating material is made from silicon nitride ($SiN_x$) or silicon oxide ($SiO_x$). Subsequently, an active layer and an ohmic contact layer within the array shown in FIG. 1 are formed by sequentially depositing an amorphous silicon layer and an amorphous silicon layer on the gate insulating film 16 and then patterning the deposited layers by photolithography and etching using a second mask.

The data lines 2 and 4 and the odd shorting bar 8 are formed by depositing a source/drain metal material onto the gate insulating film 16 using a deposition technique such as sputtering or the like and then patterning it by photolithography and etching using a third mask. The data lines 2, 4 and the odd shorting bar 8 are formed along with source/drain patterns, each of which includes the data line 3, the source electrode 9, the drain electrode 11, the storage electrode 19, the data pad 25, etc. within the array shown in FIG. 1. The source/drain metal is made from molybdenum (Mo), titanium (Ti), tantalum (Ta), a molybdenum alloy, or other suitable material.

Referring to FIG. 3C, the protective film 18 including the contact hole 12 is provided. The protective film 18 is formed by depositing an insulating material using a deposition technique such as PECVD. The protective film 18 is made from an inorganic insulating material identical to the gate insulating film 16, or an organic material having a small dielectric constant such as an acrylic organic compound, benzocyclobutene (BCB), perfluorocyclobutane (PFCB), or the like.

The fourth contact hole 12 of the even shorting bar 6 is defined, along with a plurality of contact holes 13, 21 and 29 within the array shown in FIG. 1, by patterning the protective film 18 and the gate insulating film 16 by photolithography and etching using a fourth mask.

Referring to FIG. 3D, the contact electrode 10 is formed over the fourth contact hole 12. The contact electrode 10 is formed by depositing a transparent electrode material onto the protective film 18 using a deposition technique such as sputtering and then patterning it by photolithography and etching using a fifth mask. Such a contact electrode 10 is formed along with transparent electrode patterns, each of which includes the pixel electrode 15, the data pad protection electrode 27, etc. within the array shown in FIG. 1. The transparent electrode material is formed from indium-tin-oxide (ITO), tin-oxide (TO) or indium-zinc-oxide (IZO).

In such a thin film transistor array substrate, the even data lines 4 have a characteristic in that they are relatively susceptible to static electricity in the course of the manufacturing process. Specifically, each of the even data lines 4 are separate after patterning of the source/drain metal layer until formation of the contact electrode 10. In contrast, the odd data lines 2 are commonly connected with the aid of the odd shorting bar 8 formed from the same source/drain metal layer. Thus, if static electricity occurs after patterning of the source/drain metal layer, the static electricity is diffused and therefore reduced at the odd data lines 2 commonly connected by the odd shorting bar 8, thereby preventing a damage caused by the static Electricity. However, the even data lines 4 have not been provided with the contact electrode 10 and are separated until they are commonly connected by the even shorting bar 6. Therefore, if a static electricity is input to the even data lines 4 before formation of the contact electrode 10, then the thin film transistors connected to the even data lines 4 can be damaged or a defect can occur such as a insulation breakage at an intersection between the even data line 4 and the gate line or at another location.

SUMMARY OF THE INVENTION

Accordingly, the present invention is directed to a thin film transistor array substrate for preventing static electricity and manufacturing method thereof that substantially obviates one or more of the problems due to limitations and disadvantages of the related art.

An object of the present invention is to provide a thin film transistor array substrate and a manufacturing method thereof to prevent damage caused by static electricity during the manufacturing process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other advantages and in accordance with the purpose of the present invention, the thin film transistor array substrate for a liquid crystal display comprises a plurality of thin film transistors; a plurality of data lines each connected to respective ones of the thin film transistors, the data lines including odd data lines and even data lines; an odd shorting bar commonly connected to the odd data lines of the data lines; an even shorting bar commonly connected to the even data lines of the data lines; and an equal potential shorting bar commonly connecting the odd data lines with the even data lines to form an equal potential.

In another aspect, a method of manufacturing a thin film transistor array substrate of a liquid crystal display including thin film transistors, data lines connected to the thin film transistors, an odd shorting bar commonly connected to odd data lines of the data lines, and an even shorting bar commonly connected to even data lines of the data lines, the method comprises the steps of providing the data lines, the thin film transistors, the odd shorting bar, the even shorting bar, and an equal potential shorting bar on a substrate, the equal potential shorting bar commonly connecting the odd data lines with the even data lines to form an equal potential; and providing an opening hole to define discontinuities along the equal potential shorting bar between each odd data line and each even data line.

In another aspect, a method of manufacturing a thin film transistor array substrate of a liquid crystal display including thin film transistors, data lines connected to the thin film transistors, a first shorting bar commonly connected to a first set of the data lines, and a second shorting bar commonly connected to a second set of the data lines, the method comprises the steps of providing the data lines, the thin film transistors, the first shorting bar, the second shorting bar, and an equal potential shorting bar on a substrate, the equal potential shorting bar commonly connecting the first and second sets of data lines to form an equal potential; and providing an opening hole to define discontinuities along the equal potential shorting bar between each data line.

In another aspect, a method of manufacturing a thin film transistor array substrate comprises the steps of providing a plurality of data lines, a plurality of thin film transistors, such that each data line is connected with a respective thin film transistor, a first electrical connection system interconnecting a first set of the data lines, a second electrical connection system interconnecting a second set of the data lines, and a third electrical connection system interconnecting all of the data lines; and providing at least one opening hole in the third electrical connection system to define discontinuities in the third electrical connection system, after providing the at least one opening hole, the first set of data lines remaining electrically connected, the second set of data lines remaining electrically connected, and the first and second sets of data lines being electrically isolated from each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIGS. 3A to 3E are sectional views illustrating a method of manufacturing the data shorting bars shown in FIG. 2;

FIG. 5 is a sectional view of the data shorting bars taken along line III–III' and line IV–IV' in FIG. 4;

FIGS. 6A to 6E are sectional views illustrating a method of manufacturing the data shorting bars shown in FIG. 5;

FIGS. 9A to 9D are sectional views illustrating a method of manufacturing the data shorting bars shown in FIG. 8.

DETAILED DESCRIPTION OF THE PREFERRED EMBODIMENTS

Reference will now be made in detail to the preferred embodiments of the present invention, examples of which are illustrated in the accompanying drawings.

Figure 1:
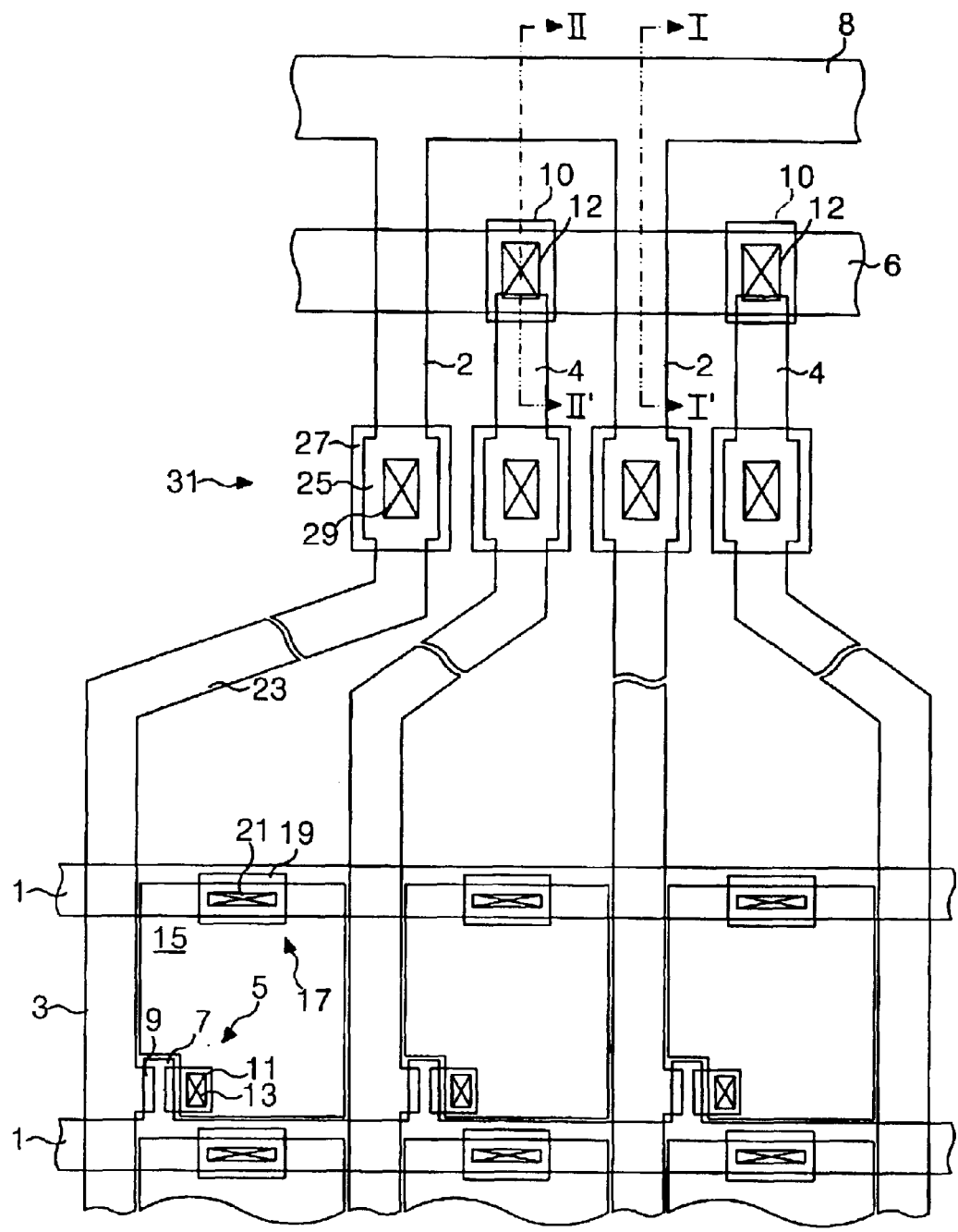
FIG. 1 is a plan view showing a thin film transistor array substrate including a related art data shorting bars.
Figure 2:
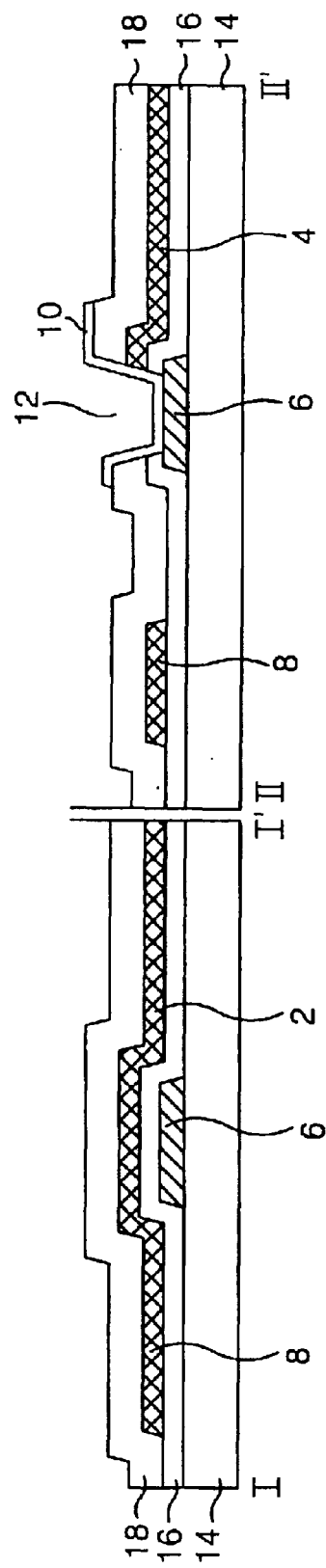
FIG. 2 is a sectional view of the data shorting bars area taken along line I–II' and line II–II' in FIG. 1.
Figure 3A:
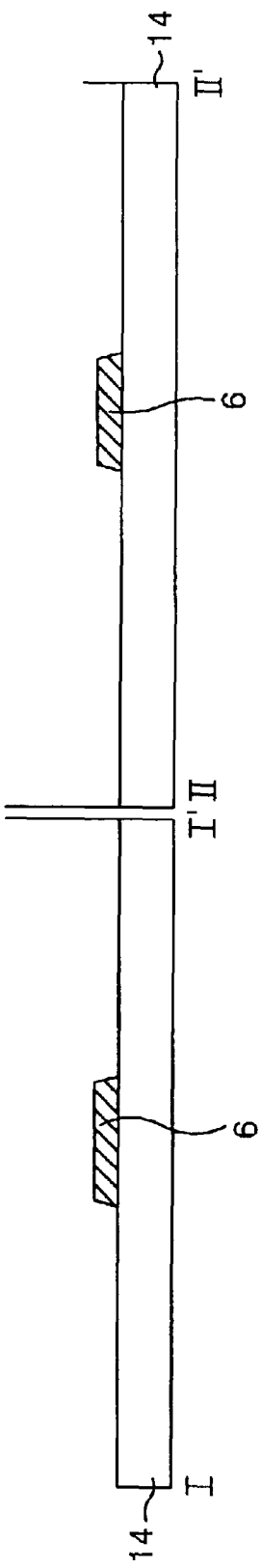
Figure 3D:
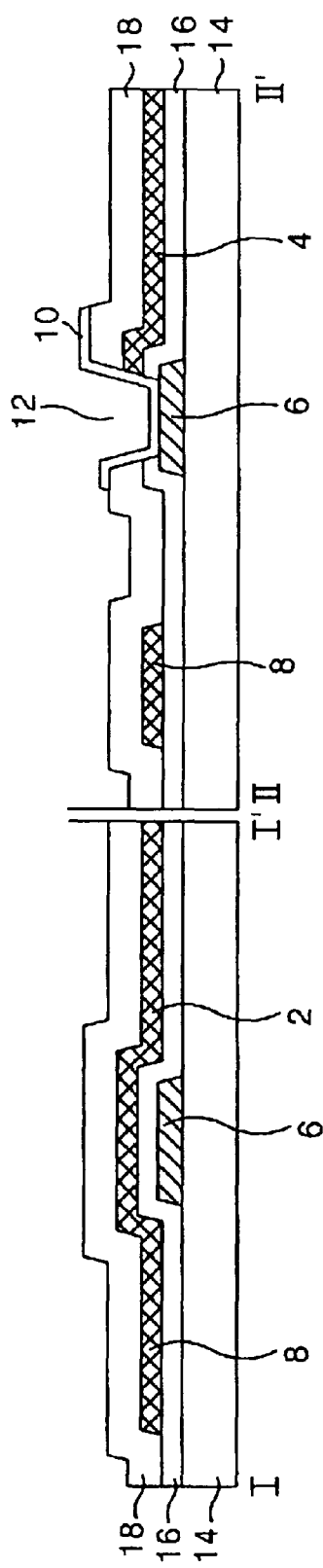
Figure 4:
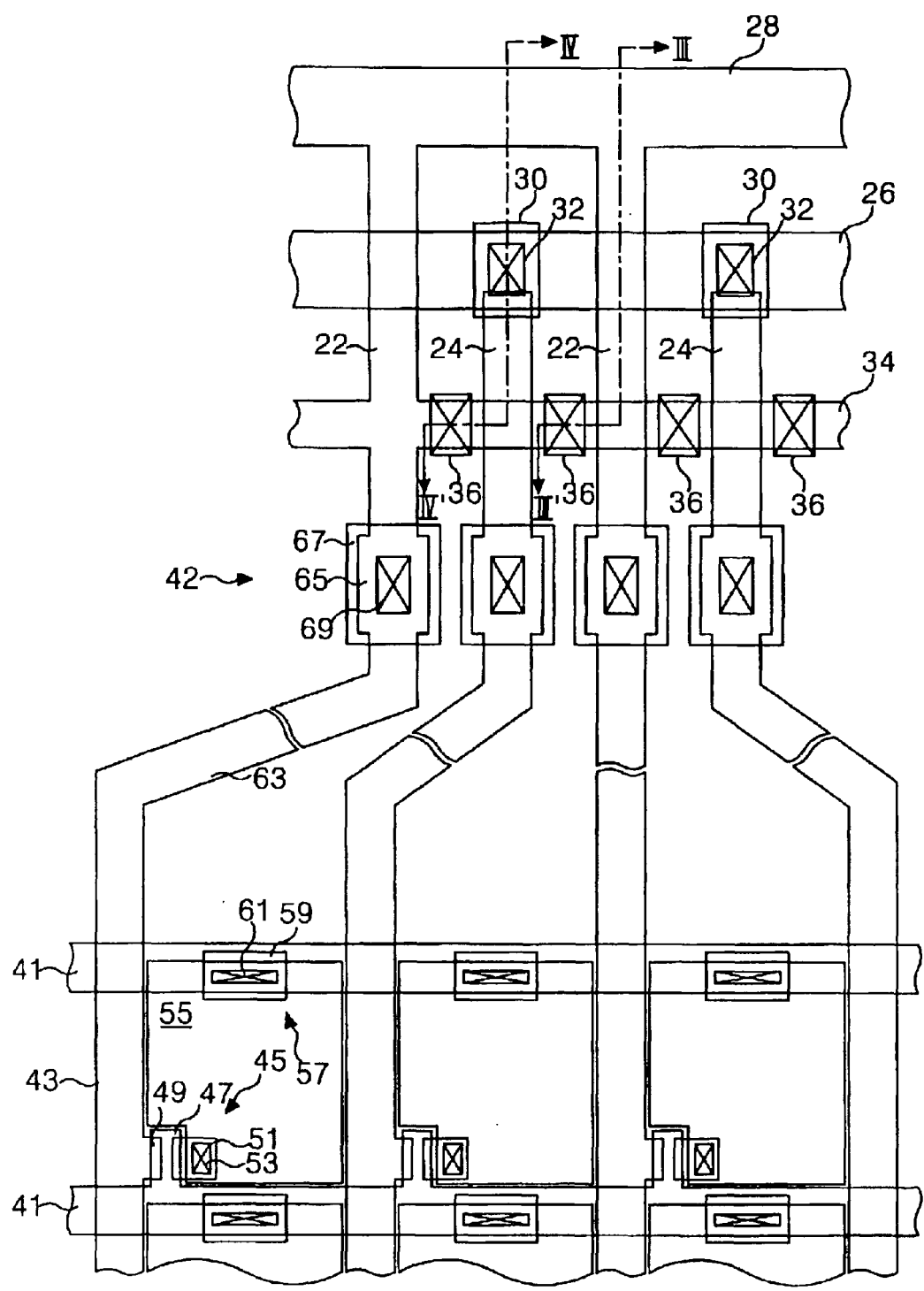
FIG. 4 is a plan view showing a structure of a thin film transistor array substrate including data shorting bars according to an embodiment of the present invention.

FIG. 4 is a plan view showing a structure of a thin film transistor array substrate including data shorting bars according to an embodiment of the present invention using a five-round mask process. The thin film transistor array substrate includes a thin film transistor 45 provided at each intersection of gate lines 41 and data lines 43 with a pixel electrode 55 connected to the thin film transistor 45. A storage capacitor 57 is formed at an overlapping portion between the pixel electrode 55 and the pre-stage gate line 41. An array area has a gate pad portion (not shown) connected to the gate line 41 and a data pad portion 42 connected to the data line 43. A data shorting bar arrangement includes an odd shorting bar 28 commonly connected via the data pad portion 42 to the odd data lines 22 and an even shorting bar 26 commonly connected to the even data lines 24, and an equal potential shorting bar 34 for commonly connecting the odd data lines 22 with the even data lines 24 until a patterning process for a the protective film.

The gate line 41 intersects the data line 43 with a gate insulating film therebetween to provide electrical insulation. A thin film transistor 45 provided at each intersection between the gate lines 41 and the data lines 43 includes a gate electrode 47 connected to the gate line 41, a source electrode 49 connected to the data line 43, a drain electrode 51 connected to the pixel electrode 55, and an active layer (not shown) overlapping with the gate electrode 47 to form a channel between the source electrode 49 and the drain electrode 51. The active layer preferably extends in a direction of the data line 43. On the active layer, ohmic contact layers are provided at areas excluding the channel portion. The thin film transistor 45 preferably allows a pixel voltage signal from the data line 43 to be applied to the pixel electrode 55 and then sustained in response to a scanning signal applied to the gate line 41.

The pixel electrode 55 is connected via a first contact hole 53 passing through a protective film (not shown) to the drain electrode 51 of the thin film transistor 45. The pixel electrode 55 generates a potential difference with respect to the common electrode provided at the upper substrate (not shown) by the charged pixel voltage. This potential difference rotates a liquid crystal disposed between the thin film transistor substrate and the upper substrate due to a dielectric anisotropy and transmits an input light via the pixel electrode 55 from a light source (not shown) that radiates toward the upper substrate.

The storage capacitor 57 has a pre-stage gate line 41, a storage electrode 59 overlapping with the gate line 41 having the gate insulating film therebetween, and a pixel electrode 55 overlapping with the storage electrode 59 having the protective film therebetween and connected via a second contact hole 61 provided in the protective film. The storage capacitor 57 allows a pixel voltage charged in the pixel electrode 55 to be stably maintained until the next pixel voltage is applied.

The data line 43 is connected via a data link 63 and a data pad portion 71 to the data driver while the gate line 41 is connected via a gate link and a gate pad portion to the gate driver. The data pad portion 42 includes a data pad 65 extended, via the data link 63, from the data line 43, and a data pad protection electrode 67 connected, via a third contact hole 69 passing through the protective film, to the data pad 65.

In the data shorting bar arrangement, an odd shorting bar 28 is commonly connected via the data pad portion 42 to odd data lines 22. Also, an even shorting bar 26 is commonly connected via the data pad portion 42 to even data lines 24. The odd shorting bar 28 and the equal potential shorting bar 34 are formed from a source/drain metal layer along with the odd and even data lines 23 and 24. The even shorting bar 26 is formed from a gate metal layer to provide insulation against the odd data lines 22 crossing it. As shown in FIG. 5, the even shorting bar 26 formed from the gate metal layer is connected, via a contact electrode 30 formed over a fourth contact hole 32, to the even data lines 24 formed from a source/drain metal layer. The equal potential shorting bar 34 allows the data lines 43 to be commonly connected to each other from a patterning process of the source/drain metal layer until a patterning process of the protective film, thereby forming an equal potential. Thus, if static electricity is input to the data lines 43 in the course of processing, the static electricity will be diffused through the commonly connected data lines 43, thereby preventing a static electricity damage, such as a thin film transistor damage or insulation damage. Subsequently, the equal potential shorting bar 34 is opened between the even and odd data lines 22 and 24 through opening holes 36 resulting from the patterning process of the protective film. When the thin film transistor array substrate has been completed, a defect inspection of the data lines 43 is made with the aid of the odd shorting bar 28 and the even shorting bar 26. Then, the data shorting bars 26 and 28 are cut along a scribing line between the equal potential shorting bar 34 and the data pad portion 42.

FIG. 5 is a section view of the data shorting bars taken along line III–III' and line IV–IV' in FIG. 4. The even shorting bar 26 formed from a gate metal layer is provided on the lower substrate 44, and the gate insulating film 46 is provided thereon. The odd data lines 22, the even data lines 24 and the odd shorting bar 28 formed from a source/drain metal layer and the equal potential shorting bar 34 are provided on the gate insulating film 46, and the protective film 48 is provided thereon. The contact hole 32 passing through the gate insulating film 46 and the protective film 48 is defined to expose the even data lines 24 and the even shorting bar 32, and an opening hole 36 passing through the protective film 48 and the equal potential shorting bar 34 is defined to open the equal potential shorting bar 34 between the odd and even data lines 22 and 24. The contact hole 32 is provided with the contact electrode 30 to connect the even data lines 24 and the even shorting bar 26 made from respectively different metal layers.

Hereinafter, a method of manufacturing the data shorting bars will be described in detail with reference to FIGS. 6A to 6D and in conjunction with a method of manufacturing the thin film transistor array substrate using a five-round mask process.

Referring to FIG. 6A, the even data shorting bar 26 is provided on the lower substrate 44. The even data shorting bar 26 is formed by depositing a gate metal material onto the lower substrate 44 by a deposition technique, such as sputtering, and then patterning the gate metal material by photolithography and etching using a first mask. Such an even data shorting bar 26 is formed along with gate patterns, each of which includes the gate line 41, the gate electrode 47, etc. within the array shown in FIG. 4. The gate metal has a single-layer or double-layer structure of chrome (Cr), molybdenum (Mo), an aluminum group metal, or other suitable conductive material.

Referring to FIG. 6B, the gate insulating film 46 is formed on the lower substrate 44 provided with the even shorting bar 26, and the odd and even data lines 22 and 24, the odd shorting bar 28 and the equal potential shorting bar 34 are disposed thereon. The gate insulating film 46 is formed by depositing a gate insulating material using a deposition technique such as plasma enhanced chemical vapor deposition. The gate insulating material is preferably made from silicon nitride ($SiN_x$) or silicon oxide ($SiO_x$). Subsequently, an active layer and an ohmic contact layer within the array shown in FIG. 4 are formed by sequentially depositing an amorphous silicon layer and an $n^+$ amorphous silicon layer on the gate insulating film 46 and then patterning the deposited layers by photolithography and etching using a second mask.

The odd and even data lines 22 and 24, the odd shorting bar 28 and the equal potential shorting bar 34 are formed by depositing a source/drain metal material onto the gate insulating film 46 using a deposition technique such as sputtering and then patterning the source/drain metal material by photolithography and etching using a third mask. The odd and even data lines 22 and 24, the odd shorting bar 28 and the equal potential shorting bar 34 are formed along with source/drain patterns, each of which includes the data line 43, the source electrode 49, the drain electrode 51, the storage electrode 59, the data pad 65, etc. within the array shown in FIG. 4. The equal potential shorting bar 34 commonly connects the odd data lines 22 with the even data lines 24 to form an equal potential. Thus, static electricity input to the odd and even data lines 22 and 24 is diffused into a wide area with the aid of the odd and even data lines 22 and 24 until the equal potential shorting bar 34 is opened, thereby preventing defects caused by static electricity. A metal that allows a dry etching, such as molybdenum (Mo), is preferably used as the source/drain metal to provide an opening of the equal potential shorting bar 34 in the later patterning process of the protective film 48.

Referring to FIG. 6C, the protective film 48 including the fourth contact hole 32 and the opening hole 36 is further provided. The protective film 48 is formed by entirely depositing an insulating material using a deposition technique such as the PECVD. The protective film 18 is preferably made from an inorganic insulating material identical to the gate insulating film 16, or an organic material having a small dielectric constant such as an acrylic organic compound, benzocyclobutene (BCB) or perfluorocyclobutane (PFCB), or the like.

The fourth contact hole 32 for the even shorting bar 26 is defined, along with a plurality of contact holes 53, 61 and 69 within the array shown in FIG. 4, by patterning the protective film 48 and the gate insulating film 46 by photolithography and dry etching using a fourth mask. At the same time, the opening hole 36 for providing an opening of the equal potential shorting bar 34 also is formed by the dry etching process in such a manner to pass through the protective film 48 and the equal potential shorting bar 34.

Referring to FIG. 6D, the contact electrode 30 is formed over the fourth contact hole 32. The contact electrode 30 is formed by depositing a transparent electrode material onto the protective film 48 using a deposition technique, such as sputtering, and then patterning the transparent electrode material by photolithography and etching using a fifth mask. Such a contact electrode 30 is formed along with transparent electrode patterns, each of which includes the pixel electrode 55, the data pad protection electrode 67, etc. within the array shown in FIG. 4. The transparent electrode material is preferably formed from indium-tin-oxide (ITO), tin-oxide (TO) or indium-zinc-oxide (IZO).

In the method of manufacturing the thin film transistor array substrate according to the present invention, the odd and even data lines 22 and 24 are commonly connected to each other from the patterning process of the source/drain metal layer until the patterning process of the protective film 48 with the aid of the equal potential shorting bar 34 to form an equal potential. Accordingly, static electricity input to the odd and even data lines 22 and 24 in the course of said processes is diffused into the odd and even data lines 22 and 24 forming an equal potential, thereby preventing damage caused by the static electricity.

Figure 7:
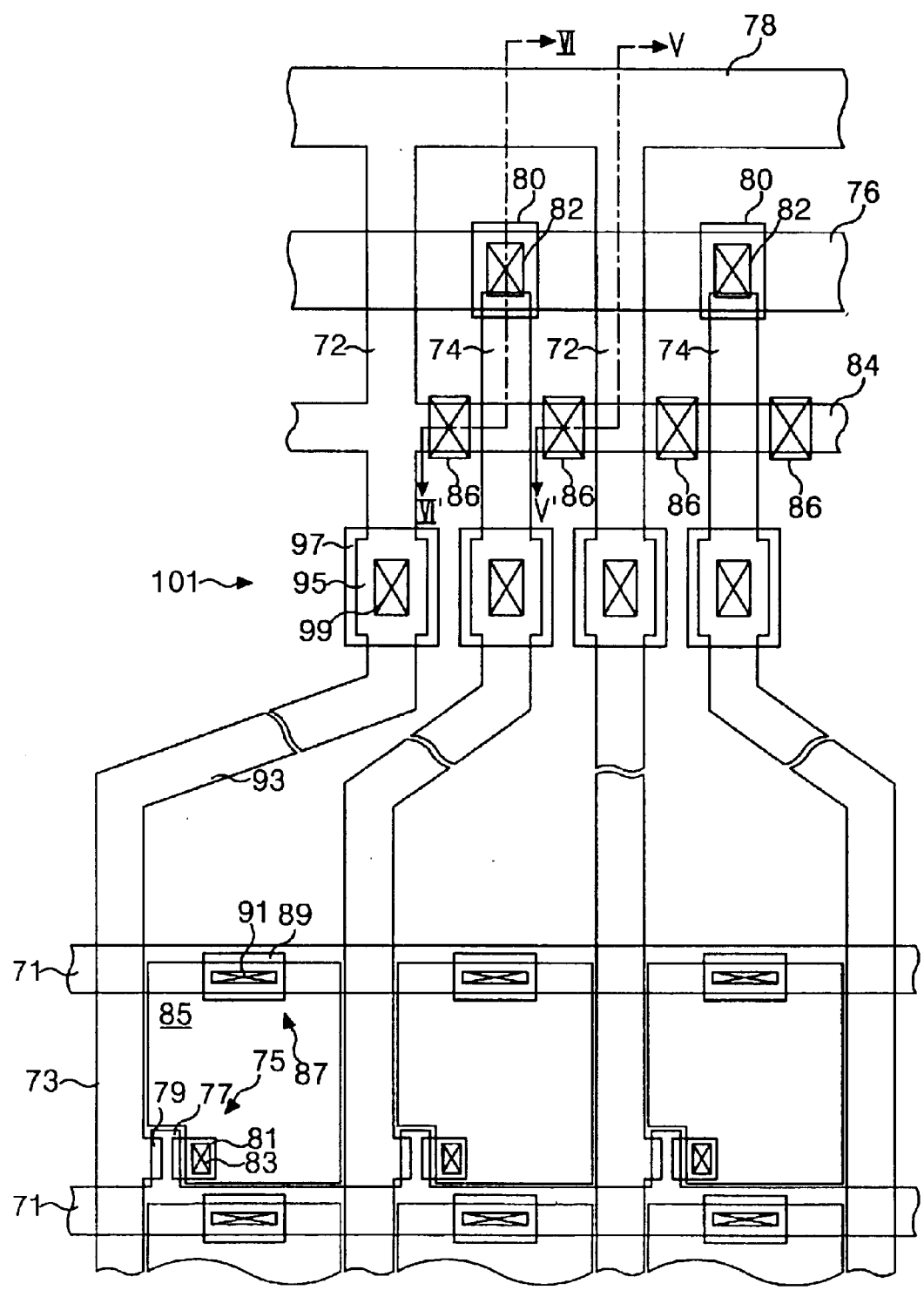
FIG. 7 is a plan view showing a structure of a thin film transistor array substrate including data shorting bars according to another embodiment of the present invention.

FIG. 7 is a plan view showing a structure of a thin film transistor array substrate including data shorting bars according to another embodiment of the present invention using a four-round mask process.

As shown in FIG. 7, the thin film transistor array substrate includes a thin film transistor 75 provided at each intersection between gate lines 71 and data lines 73. A pixel electrode 85 is connected to the thin film transistor 75, and a storage capacitor 87 is formed at an overlapping portion between the pixel electrode 85 and the pre-stage gate line 71. An array area has a gate pad portion (not shown) connected to the gate line 71 and a data pad portion 101 connected to the data line 73. An odd shorting bar 78 is commonly connected, via the data pad portion 101, to the odd data lines 72, and an even shorting bar 76 is commonly connected, via the data pad portion 101, to the even data lines 74. An equal potential shorting bar 84 commonly connects the odd data lines 72 with the even data lines 74 until a patterning process of the protective film.

The gate line 71 intersects the data line 73 with a gate insulating film therebetween to provide electrical insulation. A thin film transistor 75 provided at each intersection between the gate lines 71 and the data lines 73 includes a gate electrode 77 connected to the gate line 71, a source electrode 79 connected to the data line 73, a drain electrode 81 connected to the pixel electrode 85, and an active layer (not shown) overlapping with the gate electrode 77 to form a channel between the source electrode 79 and the drain electrode 81. The active layer includes a channel portion and is formed in the same pattern at the lower portion of source/drain patterns each of which includes the data line 73, the source electrode 79, the drain electrode 81, the storage electrode 89, the data link and pad 93 and 95, the odd shorting bar 78, the equal potential shorting bar 84, etc. On the active layer, an ohmic contact layers are provided at areas excluding the channel portion. The thin film transistor 75 preferably allows a pixel voltage signal from the data line 73 to be applied to the pixel electrode 85 and then sustained in response to a scanning signal applied to the gate line 71.

The pixel electrode 85 is connected, via a first contact hole 83 passing through a protective film (not shown), to the drain electrode 81 of the thin film transistor 75. The pixel electrode 85 generates a potential difference with respect to the common electrode provided at the upper substrate (not shown) by the charged pixel voltage. This potential difference rotates a liquid crystal positioned between the thin film transistor substrate and the upper substrate due to a dielectric anisotropy and transmits an input light, via the pixel electrode 85, from a light source (not shown) that radiates toward the upper substrate.

The storage capacitor 87 includes a pre-stage gate line 71, a storage electrode 89 overlapping with the gate line 71 having the gate insulating film therebetween, and a pixel electrode 85 overlapping with the storage electrode 89 having the protective film therebetween and connected via a second contact hole 91 provided in the protective film. The storage capacitor 87 allows a pixel voltage charged in the pixel electrode 85 to be stably maintained until the next pixel voltage is applied.

The data line 73 is connected, via a data link 93 and a data pad portion 101, to the data driver while the gate line 71 is connected, via a gate link and a gate pad portion, to the gate driver. The data pad portion 101 includes a data pad 95 extended, via the data link 93, from the data line 73, and a data pad protection electrode 97 connected, via a third contact hole 99 passing through the protective film, to the data pad 95.

Figure 8:
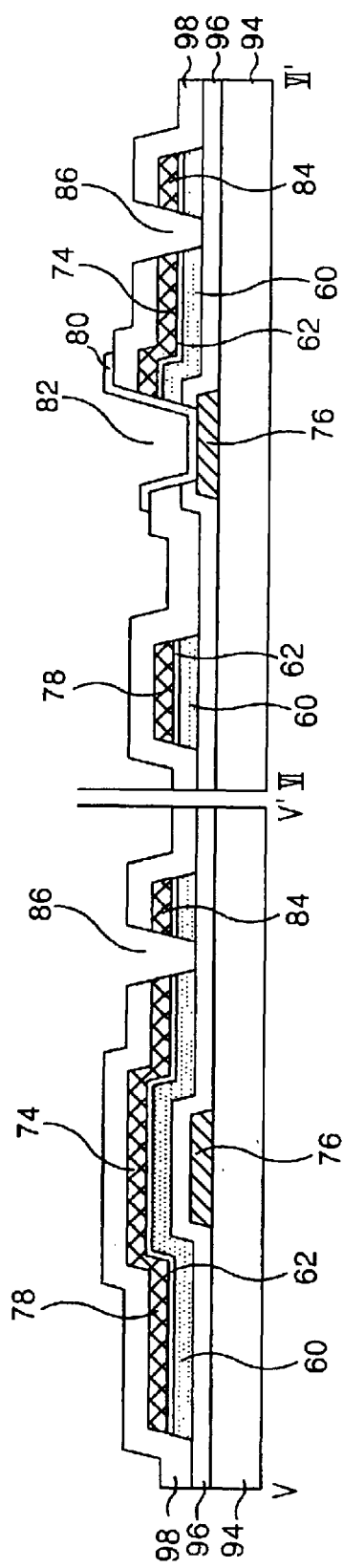
FIG. 8 is a sectional view of the data shorting bars taken along line V–V' and line VI–VI' in FIG. 7.

An odd shorting bar 78 is commonly connected, via the data pad portion 101, to odd data lines 72 while an even shorting bar 76 is commonly connected, via the data pad portion 101, to even data lines 74. The odd shorting bar 78 and the equal potential shorting bar 84 are formed from a source/drain metal layer along with the odd and even data lines 72 and 74. The even shorting bar 76 is formed from a gate metal layer such that insulation is provide between the odd data lines 72 crossing it. As shown in FIG. 8, the even shorting bar 76 formed from the gate metal layer is connected, via a contact electrode 80 formed over a fourth contact hole 82, to the even data lines 74 formed from a source/drain metal layer. The equal potential shorting bar 84 allows the data lines 73 to be commonly connected to each other from a patterning process of the source/drain metal layer until a patterning process of the protective film, thereby forming an equal potential. Thus, if static electricity is input to the data lines 73 in the course of processing, then the static electricity is diffused through the commonly connected data lines 73, thereby preventing static electricity damage such as a thin film transistor damage or insulation damage. Such an equal potential shorting bar 84 is opened between the even and odd data lines 72 and 74 through opening holes 86 resulting from the patterning process of the protective film. When the thin film transistor array substrate has been completed, a defect inspection of the data lines 73 is made with the aid of the odd shorting bar 78 and the even shorting bar 76. Then, the data shorting bars 76 and 78 are cut along a scribing line between the equal potential shorting bar 84 and the data pad portion 101.

FIG. 8 is a section view of the data shorting bars taken along line V–V' and the line VI–VI' in FIG. 7. The even shorting bar 76 is formed from a gate metal layer is provided on the lower substrate 94, and the gate insulating film 96 is provided thereon. The odd data lines 72, the even data lines 74 and the odd shorting bar 78 formed from a source/drain metal layer having the same pattern as the active layer 60 and the ohmic contact layers 62 and the equal potential shorting bar 84 are disposed on the gate insulating film 96, and the protective film 98 is provided thereon. The fourth contact hole 82 passing through the gate insulating film 96 and the protective film 98 is defined to expose the even data lines 74 and the even shorting bar 82, and an opening hole 86 passing through the protective film 98, the equal potential shorting bar 84, the ohmic contact layer 62 and the active layer 60 is defined in such a manner to open the equal potential shorting bar 84 between the odd and even data lines 72 and 74. The fourth contact hole 82 is provided with the contact electrode 80, thereby connecting the even data lines 74 and the even shorting bar 76 made from respectively different metal layers.

Hereinafter, a method of manufacturing the data shorting bar area will be described in detail with reference to FIGS. 9A to 9D and in conjunction with a method of manufacturing the thin film transistor array substrate using a four-round mask process.

Figure 9A:
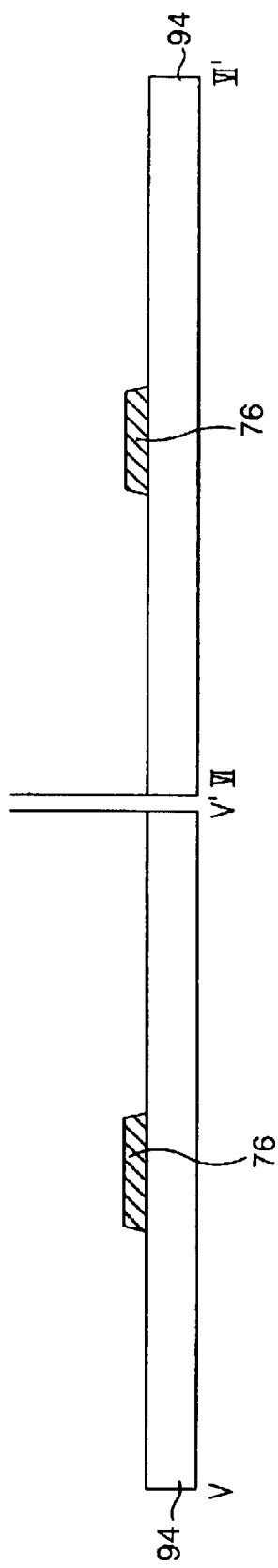

Referring to FIG. 9A, the even data shorting bar 76 is provided on the lower substrate 94. The even data shorting bar 76 is formed by depositing a gate metal material onto the lower substrate 94 by a deposition technique, such as sputtering, and then patterning the gate metal material by photolithography and etching using a first mask. Such an even data shorting bar 76 is formed along with gate patterns, each of which includes the gate line 71, the gate electrode 77, etc. within the array shown in FIG. 7. The gate metal has a single-layer or double-layer structure of chrome (Cr), molybdenum (Mo), an aluminum group metal, or other suitable conductive material.

Figure 9B:
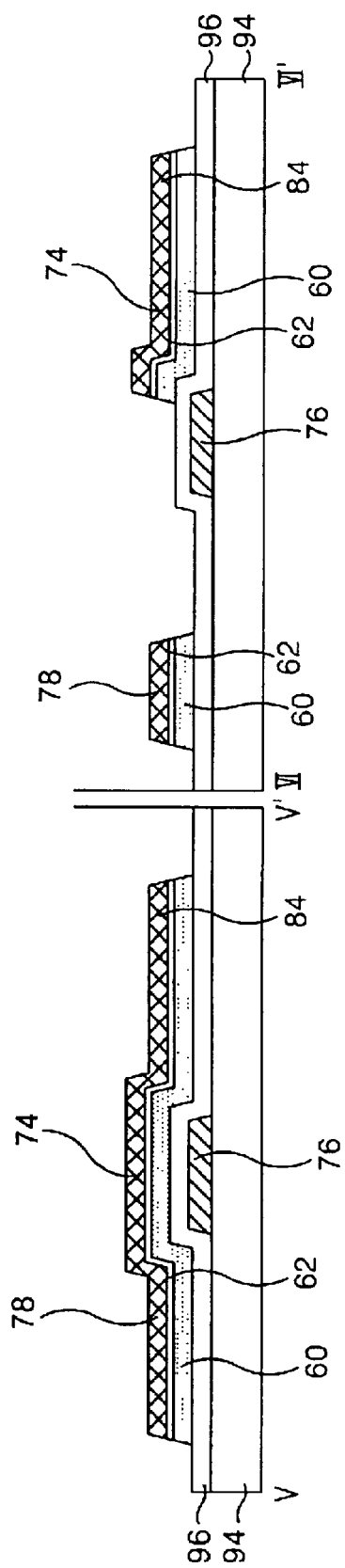

Referring to FIG. 9B, the gate insulating film 96 is formed on the lower substrate 94 provided with the even shorting bar 76, and the active layer 60, the ohmic contact layer 62 and the source/drain pattern at the shorting bar area having the same pattern are disposed thereon. The source/drain pattern at the shorting bar area includes the odd and even data lines 72 and 74, the odd shorting bar 78 and the equal potential shorting bar 84.

The gate insulating film 96 is formed by entirely depositing a gate insulating material using a deposition technique such as plasma enhanced chemical vapor deposition or the like. The gate insulating material is made from silicon nitride ($SiN_x$) or silicon oxide ($SiO_x$).

Subsequently, an amorphous silicon layer, an $n^+$ amorphous silicon layer and the source/drain metal layer are sequentially deposited on the gate insulating film 96. Then, the three deposited layers are patterned by photolithography and etching using a second mask. In this case, the source/drain metal layer is patterned by wet etching while the amorphous silicon layer and the $n^+$ amorphous silicon layer are patterned by dry etching. Accordingly, the source/drain pattern at the shorting bar area, which includes the active layer 60, the ohmic contact layers 62, the odd and even data lines 72 and 74, the odd shorting bar 78 and the equal potential shorting bar 84, is provided. The active layer 60, the ohmic contact layers 62 and the source/drain metal pattern at the shorting bar area is formed along with the source/drain pattern at the array area, which includes the active layer 60, the ohmic contact layers 62, the data line 73, the source electrode 79, the drain electrode 81, the storage electrode 89, the data pad 95, etc. Herein, the equal potential shorting bar 84 commonly connects the odd data lines 72 with the even data lines 74 to form an equal potential. Thus, static electricity input to the odd and even data lines 72 and 74 is diffused into a wide area via the commonly connected odd and even data lines 72 and 74 until the equal potential shorting bar 84 is opened, thereby preventing defects caused by the static electricity. A metal allowing dry etching, such as molybdenum (Mo) or the like, is preferably used as the source/drain metal to provide an opening of the equal potential shorting bar 84 in the later patterning process of the protective film.

Referring to FIG. 9C, the protective film 98 including the fourth contact hole 82 and the opening hole 86 is further provided. The protective film 98 is formed by depositing an insulating material using a deposition technique such as PECVD or the like. The protective film 98 is preferably made from an inorganic insulating material identical to the gate insulating film 16, or an organic material having a small dielectric constant such as an acrylic organic compound, benzocyclobutene (BCB), perfluorocyclobutane (PFCB), or the like.

The fourth contact hole 82 of the even shorting bar 76 is defined, along with a plurality of contact holes 83, 91 and 99 within the array shown in FIG. 7, by patterning the protective film 98 and the gate insulating film 96 by photolithography and dry etching using a third mask. At the same time, the opening hole 86 for providing an opening of the equal potential shorting bar 84 also is formed by dry etching to pass through the protective film 98 and the equal potential shorting bar 84.

Referring to FIG. 9D, the contact electrode 80 is formed over the fourth contact hole 82. The contact electrode 80 is formed by depositing a transparent electrode material onto the protective film 98 using a deposition technique such as sputtering and then patterning the transparent electrode material by photolithography and etching using a fourth mask. Such a contact electrode 90 is formed along with transparent electrode patterns, each of which includes the pixel electrode 85, the data pad protection electrode 97, etc. within the array shown in FIG. 7. The transparent electrode material is formed from indium-tin-oxide (ITO), tin-oxide (TO) or indium-zinc-oxide (IZO).

In the method of manufacturing the thin film transistor array substrate according to the present invention, the odd and even data lines 72 and 74 are commonly connected to each other from the patterning process of the source/drain metal layer until the patterning process of the protective film 98 via the equal potential shorting bar 84 to form an equal potential. Accordingly, static electricity input to the odd and even data lines 72 and 74 during processing is diffused into the odd and even data lines 72 and 74 which form an equal potential, thereby preventing damage from being caused by the static electricity.

As described above, according to the present invention, the data lines are commonly connected to each other from the patterning process of the source/drain metal layer until the patterning process of the protective film with the aid of the equal potential shorting bar to form an equal potential. Accordingly, static electricity input to the data lines during processing is diffused into the data lines having an equal potential, thereby preventing damage, such as a thin film transistor damage or insulation damage caused by the static electricity.

It will be apparent to those skilled in the art that various modifications and variations can be made in the thin film transistor array substrate for preventing static electricity and manufacturing method thereof of the present invention without departing from the spirit or scope of the invention. Thus, it is intended that the present invention cover the modifications and variations of this invention provided they come within the scope of the appended claims and their equivalents.

What is claimed is:

1. A thin film transistor array substrate for a liquid crystal display, comprising:
 a plurality of thin film transistors;
 a plurality of data lines each connected to respective ones of the thin film transistors, the data lines including odd data lines and even data lines;

an odd shorting bar commonly connected to the odd data lines of the data lines;

an even shorting bar commonly connected to the even data lines of the data lines;

an equal potential shorting bar commonly connecting the odd data lines with the even data lines to form an equal potential; and a semiconductor layer provided at the first one of the odd and even shorting bars, at the data lines corresponding to the first one of the odd and even shorting bars, and at a lower portion of the equal potential shorting bar.

2. The thin film transistor array substrate according to claim 1, wherein the equal potential shorting bar is commonly connected to the data lines to distribute applied charges among the plurality of the thin film transistors.

3. The thin film transistor array substrate according to claim 2, wherein a first one of the odd and even shorting bars is formed from a source/drain metal layer of the same material as the data lines and the equal potential shorting bar, and wherein a second one of the odd and even shorting bars is formed from a gate metal layer having the source/drain metal layer thereon with a gate insulating film between the gate metal layer and the source/drain metal layer.

4. The thin film transistor array substrate according to claim 3, further comprising a protective film disposed over the data lines and the thin film transistors.

5. The thin film transistor array substrate according to claim 4, further comprising a contact electrode disposed through the protective film via a contact hole to electrically connect the second one of the odd and even shorting bars with a corresponding data line.

6. The thin film transistor array substrate according to claim 1, further comprising a plurality of pixel electrodes each connected via a respective contact hole to respective ones of the plurality of the thin film transistors.

7. The thin film transistor array substrate according to claim 1, wherein the equal potential shorting bar is formed of an electrically conductive material.

8. A method of manufacturing a thin film transistor array substrate of a liquid crystal display including thin film transistors, data lines connected to the thin film transistors, an odd shorting bar commonly connected to odd data lines of the data lines, and an even shorting bar commonly connected to even data lines of the data lines, the method comprising the steps of:

providing the data lines, the thin film transistors, the odd shorting bar, the even shorting bar, and an equal potential shorting bar on a substrate, the equal potential shorting bar commonly connecting the odd data lines with the even data lines to form an equal potential; and providing an opening hole to define discontinuities along the equal potential shorting bar between each odd data line and each even data line.

9. The method according to claim 8, wherein the equal potential shorting bar commonly connects the data lines to distribute applied charges among to the plurality of thin film transistors until the opening holes are provided in the equal potential shorting bar.

10. The method according to claim 8, wherein the step of providing the data lines, the thin film transistors, the odd shorting bar, the even shorting bar and the equal potential shorting bar includes the steps of:

forming gate patterns on the substrate, each gate pattern having a gate line, a gate electrode, and a first one of the odd and even shorting bars;

depositing a gate insulating film on the lower substrate and the gate patterns;

forming a semiconductor pattern to provide a channel of the thin film transistor on the gate insulating film; and forming source/drain metal patterns on the gate insulating film and the semiconductor pattern, each of the source/drain metal patterns having the data line, source and drain electrodes, a second one of the odd and even shorting bars, and the equal potential shorting bar.

11. The method according to claim 10, further comprising the steps of:

forming a plurality of contact holes to expose desired portions of the data lines, the thin film transistors, and the shorting bars; and forming a contact electrode to connect the first one of the odd and even shorting bars is electrically connected to the corresponding data lines via a contact hole through the gate insulating film.

12. The method according to claim 8, wherein the step of providing the data lines, the thin film transistors, the odd shorting bar, the even shorting bar and the equal potential shorting bar includes the steps of:

forming gate patterns on the substrate, each gate pattern having a gate line, a gate electrode, and a first one of the odd and even shorting bars;

depositing a gate insulating film on the lower substrate and the gate patterns; and sequentially depositing a semiconductor layer and a source/drain metal layer on the gate insulating film and then patterning the semiconductor layer and the source/drain metal layer to form a semiconductor pattern including channel portions of the respective thin film transistors and source/drain metal patterns, the source/drain metal patterns defining the data lines, the source and drain electrodes, the second one of the odd and even shorting bars, and the equal potential shorting bar.

13. The method according to claim 12, wherein the opening hole passes through a protective film formed on the thin film transistors and the data lines, the equal potential shorting bar, and the semiconductor pattern.

14. The method according to claim 12, further comprising the steps of:

forming a plurality of contact holes to expose desired portions of the data lines, the thin film transistors, and the shorting bars; and forming a contact electrode to connect the first one of the odd and even shorting bars is electrically connected to the corresponding data lines via a contact hole through the gate insulating film.

15. The method according to claim 8, further comprising a step of cutting off a portion of the substrate having the even and odd shorting bars.

16. The method according to claim 8, wherein the equal potential shorting bar is formed of an electrically conductive material.

17. A method of manufacturing a thin film transistor array substrate of a liquid crystal display including thin film transistors, data lines connected to the thin film transistors, a first shorting bar commonly connected to a first set of the data lines, and a second shorting bar commonly connected to a second set of the data lines, the method comprising the steps of:

providing the data lines, the thin film transistors, the first shorting bar, the second shorting bar, and an equal potential shorting bar on a substrate, the equal potential shorting bar commonly connecting the first and second sets of data lines to form an equal potential; and providing an opening hole to define discontinuities along the equal potential shorting bar between each data line.

18. The method according to claim 17, wherein at least one of the first set of data lines is disposed between any two ones of the second set of data lines.

19. The method according to claim 17, wherein the equal potential shorting bar commonly connects the data lines to distribute applied charges among to the plurality of thin film transistors until the opening holes are provided in the equal potential shorting bar.

20. The method according to claim 17, further comprising a step of cutting off a portion of the substrate having the first and second shorting bars.

21. The method according to claim 17, wherein the equal potential shorting bar is formed of an electrically conductive material.

22. A method of manufacturing a thin film transistor array substrate, comprising the steps of:

providing a plurality of data lines, a plurality of thin film transistors, such that each data line is connected with a respective thin film transistor, a first electrical connection system interconnecting a first set of data lines, a second electrical connection system interconnecting a second set of data lines, and a third electrical connection system interconnecting all of the data lines; and providing at least one opening hole in the third electrical connection system to define discontinuities in the third electrical connection system, after providing the at least one opening hole, the first set of data lines remaining electrically connected, the second set of data lines remaining electrically connected, and the first and second sets of data lines being electrically isolated from each other.

23. The method according to claim 22, wherein the equal potential shorting bar is formed of an electrically conductive material.

* * * * *